United States Patent Office 3,158,436
Patented Nov. 24, 1964

3,158,436
METHOD OF BLEACHING COTTON FABRICS WITH A CHLORINATED ACETONE-UREA CONDENSATION PRODUCT
Michael Kokorudz, Southgate, Mich., assignor to Wyandotte Chemicals Corporation, Wyandotte, Mich., a corporation of Michigan
No Drawing. Original application May 4, 1961, Ser. No. 107,629, now Patent No. 3,104,260, dated Sept. 17, 1963. Divided and this application Aug. 11, 1961, Ser. No. 130,776
2 Claims. (Cl. 8—108)

This invention relates to a new active chlorine compound. In a further aspect this invention relates to a new solid organic bleach compound.

This application is a division of application Serial No. 107,629, filed May 4, 1961, now U.S. Patent 3,104,260.

In recent years considerable effort has been expended towards the development of new solid organic active chlorine compounds for use as bleaching agents. The various hypochlorites, such as sodium and calcium hypochlorites, which have been customarily used in the past are injurious to the skin of the user, weaken fabric strength and are unstable. Therefore, new active chlorine compounds are being sought which are safe and convenient to use as well as being stable and having high concentrations of available chlorine for bleaching uses. The organic active chlorine compounds have been found, in general, to be more stable than inorganic active chlorine compounds. Thus, recently some commercial acceptance has been given to organic active chlorine compounds such as dichlorocyanuric acid, trichloroisocyanuric acid and 1,3-dichloro-5,5-dimethylhydantoin. However, all of the organic active chlorine compounds known in the art have certain disadvantages and workers in the art are continuing their search for new and effective organic active chlorine compounds for use as bleaches.

Therefore an object of this invention is to provide a new and effective organic active chlorine compound useful as a bleach.

Another object is to provide a new bleach composition incorporating a new organic active chlorine compound.

A further object is to provide a method of bleaching cotton fabrics with a new organic active chlorine compound.

These objects and others have been accomplished in this invention by the discovery of a new and effective organic active chlorine solid bleach compound. This compound is the product of the process in which an acetone-urea condensation product, prepared by introducing a strong dehydrating mineral acid such as hydrochloric acid and sulfuric acid into a mixture of urea and acetone, is suspended in an aqueous solution having a pH of less than about 12.5. The resulting mixture is cooled to a temperature in the range of about 0 to 30° C. and chlorine gas is passed into the mixture while the temperature is maintained at no more than about 30° C. The new compound is of unknown chemical structure and is readily prepared in high yields as a white solid which requires little or no purification by the direct chlorination of the acetone-urea condensation product. The new compound has been found to be extremely effective as a solid bleach and has no odor, which adds considerably to its commercial importance.

The new organic active chlorine compound of the invention can be used in a formulated bleaching composition by mixing it in the substantially dry state with alkaline salts, such as sodium carbonate, sodium borate, sodium silicate, trisodium phosphate, tetrasodium pyrophosphate, sodium triphosphate or mixtures of these. In addition, wetting agents, synthetic detergents generally, soaps, fillers, abrasives and water softening agents of the inorganic or organic type may be incorporated in bleach compositions containing the new solid organic active chlorine compound of the invention in order to impart special properties.

The new organic active chlorine compound of the invention is characterized by a high degree of stability when dry and may be stored for long periods of time and transported over considerable distances without substantial decomposition. When the new active chlorine compound of the invention is dissolved in water, the ingredients of the mixture apparently react to yield hypochlorite chlorine which is responsible for the efficient oxidizing and bleaching action.

The new compound of the invention is readily prepared as a pure white solid in high yield and can be formed into tablets, sticks, cubes or agglomerates as well as in powdered form with or without the aforesaid alkaline salts and soaps, fillers, abrasives and water softening agents of the inorganic or organic type for use in bleaching operations.

The new organic active chlorine bleach compound of this invention is readily prepared by suspending an acetone-urea condensation product in an aqueous solution having a pH of less than about 12.5, cooling the resulting mixture to below about 14° C. and passing chlorine gas into the cooled mixture while maintaining the temperature at no more than about 30° C.

The acetone-urea condensation product is prepared by reacting a mixture of acetone and urea with a strong mineral acid dehydrator such as hydrochloric acid and sulfuric acid. Urea is suspended in a molar excess of acetone sufficient to serve as the reaction media as well as one of the reactants. In practice it has been found that a ratio of about 3.5:1 mols of acetone to mols of urea is sufficient to obtain high yields. The mineral acid must be present in sufficient quantity to remove the water formed by the reaction. Successful reactions have been carried out where the mineral acid was present in the ratio of 1:1 mols of acid to mols of urea. The reaction is carried out at a temperature up to and including about 60° C. and until the crystals of the acetone-urea condensation product have been formed. The crystals are separated from the reaction mixture by filtration and air dried. The condensation product produced is of unknown structure, but has been analyzed and found to contain carbon, hydrogen and nitrogen in a weight ratio of about 47 parts to 8.6 parts to 20.3 parts, respectively. This analysis corresponds to an approximate empirical formula of $C_{11}H_{20}N_4O_2$.

The aqueous solution in which the chlorination is carried out can be alkaline, neutral or acidic before the chlorination is commenced. The solution may be rendered alkaline or acidic by the use of any material which does not have an adverse effect resulting in the decomposition of the acetone-urea condensation product. This problem can generally be avoided if the pH is kept below about 12.5. Examples of suitable materials are sodium or potassium carbonate or bicarbonate and hydrochloric acid. However, ammonium salts should not be used because of the danger of forming nitrogen trichloride. Sodium hydroxide and potassium hydroxide present in concentrations of about 10% decomposed the acetone-urea condensation product and therefore should be avoided. Good yields of the chlorinated acetone-urea condensation product have been obtained when the acetone-urea condensation product was suspended in water and higher yields were obtained when the condensation product was suspended in an aqueous alkaline solution having 1.4 mol equivalents of sodium carbonate per 100 grams of condensation product.

The temperature of the mixture while the chlorine gas is passed into the mixture is desirably about 0 to 30°C. and preferably should not be substantially above about 15°C.

Chlorine gas is passed in over a period of time in the range of about 0.5 to about 6 hours until the acetone-urea condensation product is chlorinated. In the case where chlorination is carried out in an alkaline solution containing about 1.4 mol equivalents of alkaline compound per 100 grams of acetone-urea condensation product, chlorine gas is passed into the cooled mixture until the pH of the reaction mixture is in the range of 7–5, desirably about 6. It should be apparent that the chlorination is completed at a higher pH when higher concentrations of alkaline compound are employed. In the case of mixtures initially neutral, acidic, or slightly alkaline (containing less than 1.4 mol equivalents of alkaline compound per 100 grams of acetone-urea condensation product), the chlorine addition is stopped when the solution becomes noticeably yellow due to the termination of the acetone-urea condensation product chlorination.

When the addition of chlorine gas is completed the white solid product is easily separated from the reaction mixture by filtration and air dried. The chlorinated product thus obtained is of unknown structure and contains approximately 36% of carbon, 15% of nitrogen, 4% of hydrogen and 34% of chlorine. This analysis corresponds to an approximate empirical formula of

$$C_{11}H_{16}N_4O_2Cl_4.$$

The compound is very stable under ordinary conditions but undergoes rapid decomposition at about 90°C.

The new organic active chlorine compound of this invention and the method by which it can be prepared are illustrated in the following examples which are intended to illustrate the invention without unduly restricting it.

*Example 1*

The acetone-urea condensation product was prepared by suspending 120 grams of urea in 400 ml. of acetone in a 1-liter 3-necked flask equipped with a stirrer, thermometer, condenser, and addition funnel for introducing the sulfuric acid. 200 grams of anhydrous sulfuric acid were introduced into the mixture continuously over a period of about 1 hour. The mixture was initially at room temperature and when the sulfuric acid was introduced the temperature increased because of the exothermic reaction and was held within the range of 50–56°C. After the addition of the sulfuric acid was completed, the mixture was stirred for about 7 hours at a temperature of 58–60°C. and allowed to stand at room temperature for about 15 hours. The mixture was filtered and the crude product washed with methanol. After washing, the product was suspended in 750 ml. of ice water and 200 ml. of 25% NaOH solution were added to neutralize the free acid present. The white solid product was filtered and dried. The weight of the product after drying was 214 grams.

The new active chlorine bleach compound of the invention was prepared by the chlorination of the acetone-urea condensation product prepared by the procedure described above. An alkaline solution in which the chlorination was carried out was prepared by dissolving 75 grams (0.7 mol) of $Na_2CO_3$ in 1,000 ml. of water. The aqueous sodium carbonate solution was cooled to 10° C. and 100 grams of acetone-urea condensation product were added.

The pH after addition of the acetone-urea condensation product was 11.5.

Chlorine gas was introduced to the aqueous alkaline solution of the acetone-urea condensation product while cooling the mixture so that the temperature was in the range of 3–6°C. Chlorine gas was passed into the alkaline solution over a period of about 5 hours until the pH was 6.0. The white solid product which was produced was filtered and air dried at room temperature and weighed.

A yield of 125 grams of the chlorinated acetone-urea condensation product was obtained. Analysis showed the compound contained 33.8% active chlorine.

The active chlorine compound prepared was tested for bleaching activity by dissolving a sufficient quantity of the product in a liter of water so that the concentration of the product was sufficient to provide 200 parts per million of available chlorine. Deionized water was used to prepare the solution. The test procedure used was that described in U.S. 2,957,915, column 3, lines 16–40, using a Hunter Multi-Purpose Reflectometer.

The test of the active chlorine compound prepared in this example at 200 parts per million provided a bleached swatch which had a 65.8% reflectance at pH of 10. These results are generally equal to or superior to the bleaching effectiveness of 1,3-dichloro-5,5-dimethylhydantoin which gave a bleached swatch under comparable conditions having a 65.6% reflectance.

*Example 2*

The acetone-urea condensation product was prepared by suspending 120 grams of urea in 800 ml. of acetone in a 1-liter 3-necked flask equipped with a stirrer, thermometer, condenser, and tube for introducing the hydrochloric acid. 92 grams of anhydrous hydrochloric acid were introduced into the mixture continuously over a period of 2 hours. The mixture was initially at room temperature and when the hydrochloric acid was introduced the temperature increased because of the exothermic reaction and was held within the range of 40–51°C. After the addition of the hydrochloric acid was completed, the mixture was stirred for about 4 hours at 42–58° C. and then allowed to stand at room temperature for about 65 hours. The mixture was cooled to 20°C. and the solids were filtered. After filtering the solids were added to 500 ml. of ice water and 200 ml. of a 25% NaOH solution were added. The mixture was cooled to 10°C. and the solids were filtered and washed with methanol. The weight of the white product after drying was 169 grams.

The acetone-urea condensation product was chlorinated according to the procedure described in Example 1. 100 grams of the condensation product were added to a 5% $Na_2CO_3$ solution prepared by dissolving 75 grams of $Na_2CO_3$ in 1500 ml. of water. The mixture was cooled to 10° C. and chlorine was introduced into the mixture having an initial pH of 11.5 for about 53 minutes at which time the pH of the mixture was 6.0. The temperature was maintained at 6–8° C. during chlorination. The white solid product was filtered and air dried at room temperature. The yield was 135 grams. Analysis of the product showed the active chlorine content to be 32.7%.

The product of this example was tested for bleaching effectiveness according to the procedure described under Example 1.

The product of this example at a chlorine concentration of 200 parts per million provided a bleached swatch which had a 64.5% reflectance at pH of 10. The results were superior to those of 1,3-dichloro-5,5-dimethylhydantoin under the same conditions which had a 64.0% reflectance.

*Example 3*

The acetone-urea condensation product was prepared according to the procedure set forth in Example 1.

The new bleach compound of the invention was prepared by the chlorination of the acetone-urea condensation product in water. 48 grams of the acetone-urea condensation product were suspended in 1500 ml. of water and cooled to a temperature of 10° C. Chlorine was introduced into the mixture for about 35 minutes while maintaining the mixture at a temperature of about 10–12° C. at which time the mixture was yellow in color. The mixture was filtered and air dried. After drying the white solid active chlorine compound was weighed and the yield found to be 62 grams. The product was analyzed and the active chlorine content was found to be 28%.

It should be apparent that, since the new organic active chlorine compounds of this invention are useful as solid bleach compounds for bleaching cotton fabric, the new compound is therefore the basis for new methods and compositions for bleaching cotton fabrics employing this compound as the active chlorine agent. Also, the new method by which the new organic active chlorine compound has been prepared is considered as an embodiment of this invention.

I claim:

1. A method for bleaching cotton fabrics which comprises contacting said fabrics with an aqueous solution of the produce of the process which comprises suspending an acetone-urea condensation product, formed by introducing a strong dehydrating mineral acid selected from the group consisting of hydrochloric acid and sulfuric acid into mixed urea and acetone containing a molar excess of acetone, in water having a pH of less than about 12.5, cooling the resulting mixture to a temperature in the range of about 0–30° C., and passing chlorine gas into the cooled mixture while maintaining the temperature at no more than about 30° C. for a time sufficient to effect the formation of a chlorinated acetone-urea condensation product.

2. A method for bleaching cotton fabrics which comprises contacting said fabrics with an aqueous solution of the product of the process which comprises suspending an acetone-urea condensation product, formed by introducing a strong dehydrating mineral acid selected from the group consisting of hydrochloric acid and sulfuric acid into mixed urea and acetone containing a molar excess of acetone, in water having a pH of less than about 12.5, cooling the resulting mixture to a temperature in the range of 0–30° C., and passing chlorine gas into the cooled mixture while maintaining the temperature at no more than about 30° C. for a time sufficient to effect the formation of a chlorinated acetone-urea product, wherein said aqueous solution contains about 200 parts per million of available chlorine.

References Cited in the file of this patent

UNITED STATES PATENTS

| | | |
|---|---|---|
| 2,980,488 | Kokorudz | Apr. 18, 1961 |
| 3,104,260 | Kokorudz | Sept. 17, 1963 |

OTHER REFERENCES

Chemical Week, November 21, 1953, pages 81–82.